UNITED STATES PATENT OFFICE.

EARLE P. W. HARDING, OF PORTLAND, OREGON.

VISCOGEN CONTAINING PHENOLPHTHALEIN.

1,199,035.

No Drawing.

Specification of Letters Patent. Patented Sept. 19, 1916.

Application filed February 17, 1915. Serial No. 8,903.

*To all whom it may concern:*

Be it known that I, EARLE P. W. HARDING, a citizen of the United States, residing at Portland, in the county of Multnomah, State of Oregon, have invented a new and useful Viscogen Containing Phenolphthalein, of which the following is a specification.

My preparation (combination) consists of the following ingredients, combined in the following proportions, stated, viz: calcium oxid, 1 part by weight; sucrose, 2.5 parts by weight; water, pure, 8 parts by weight. This compound is commonly called "viscogen". To the finished product as described below, is added an indicator, for example, phenolphthalein, .5 grain per fluid ounce.

This preparation is entitled, "viscogen containing phenolphthalein", and is made by treating the calcium oxid with three parts of water, and when chemical action has ceased, mixing with the sucrose, previously dissolved in five parts of water. The resulting mixture is thoroughly stirred, and the supernatant liquid separated from the residue. To this above mentioned liquid, is added .5 grain of an indicator, e. g. phenolphthalein, per fluid ounce of the said liquid. The resulting solution constitutes the finished product.

The preparation may be used in the following manner: The cream to be whipped is divided into two parts, one of which is twice the volume of the other. To the larger portion is added, with constant stirring, the preparation, until the cream retains a faint permanent pink tint. The smaller portion is then added, and the cream "whipped".

The preparation is essentially a solution of calcium sucrate containing .5 grain of phenolphthalein per fluid ounce.

I am aware that solutions of calcium sucrate have been used for the purpose of thickening cream or milk, and that solutions of phenolphthalein have been used in chemistry for indicators, but am not aware that a mixture of the two as above indicated has been used for the purpose set forth.

The preparation herein described is an improvement on any mixture for a similar purpose heretofore made, since by the use of an indicator, in the solution of sucrate, or other preparation, the correct amount to use is always accurately determined.

I claim:

Viscogen containing about five tenths of a grain of phenolphthalein per fluid ounce.

E. P. W. HARDING.

Witnesses:
W. D. FREEMAN,
RALPH I. THOMPSON.

Copies of this patent may be obtained for five cents each, by addressing the "Commissioner of Patents, Washington, D. C."